United States Patent [19]

Coetzer

[11] 4,164,608
[45] Aug. 14, 1979

[54] CATHODE, AND A CELL INCORPORATING SUCH A CATHODE

[75] Inventor: Johan Coetzer, Pretoria, South Africa

[73] Assignee: The South African Inventions Development Corporation, Pretoria, South Africa

[21] Appl. No.: 884,069

[22] Filed: Mar. 6, 1978

[30] Foreign Application Priority Data

Mar. 9, 1977 [ZA] South Africa .................. 77/1433

[51] Int. Cl.$^2$ .......................................... H01M 10/44
[52] U.S. Cl. ................................. 429/50; 429/218; 429/112
[58] Field of Search ............... 429/50, 112, 218, 103, 429/104; 252/500, 512

[56] References Cited

U.S. PATENT DOCUMENTS

| 3,186,875 | 6/1965 | Freeman, Jr. ................ 429/191 |
| 3,236,693 | 2/1966 | Caesar ............................ 429/19 |
| 3,716,409 | 2/1973 | Cairns et al. ................... 429/103 |
| 3,736,186 | 5/1973 | Liang ............................. 136/83 R |
| 3,864,168 | 2/1975 | Casey, Jr. et al. ............. 136/6 LN |
| 4,076,905 | 2/1978 | Sammells ........................ 429/112 |

OTHER PUBLICATIONS

K. Seff, 'The Crystal Structure of a Sulfur Sorption Complex of Zeolite 4A', J. Phys. Chem. 76, 2601 (1972).

Primary Examiner—Charles F. LeFevour
Attorney, Agent, or Firm—Pollock, Vande Sande & Priddy

[57] ABSTRACT

A cathode for a high temperature cell, the cathode comprising an electronegative element selected from the group consisting of sulphur and selenium, and a molecular sieve carrier wherein the electronegative element is sorbed and wherein the electronegative element is held captive during use of the cathode in a cell. The molecular sieve carrier conveniently comprises dehydrated zeolite crystals. A high temperature cell comprising a cathode as described, a lithium alloy anode and an electrolyte comprising an eutectic mixture of potassium iodide-lithium iodide, or potassium chloride-lithium chloride.

39 Claims, 4 Drawing Figures

CATHODE, AND A CELL INCORPORATING SUCH A CATHODE

This invention relates to a cathode for a cell, to a method of forming such a cathode, to a cell incorporating such a cathode, and to the immobilisation of certain electrochemical reactants.

There is an ever increasing demand for suitable energy storage mechanisms in general and, in particular, for off-peak energy storage in utility networks and for electric vehicle propulsion.

In recent times increasing attention has been given to the development of improved electrochemical energy storage mechanisms.

The most promising developments relate to cell systems in which alkali metals are coupled with highly electronegative elements such as sulphur.

These developments have however been retarded by the difficulties involved in controlling and manipulating the reactive electrochemical reactants.

Two fundamental approaches have been followed in the study of such alkali metal-sulphur cells.

In accordance with the first fundamental approach, the proposal was that the electrodes should consist of molten sodium and sulphur separated by a solid electrolyte.

The solid electrolyte was thus intended to serve the dual purpose of functioning as an electrolyte as well as the necessary separator for the molten electrodes.

Thus, for example, beta-alumina has been proposed as the solid electrolyte. Beta-alumina is a ceramic which thus serves as a separator for the molten electrodes, and shows good ionic conductivity for sodium ions at about 300° C.

This approach does, however, have several disadvantages. Molten sodium and molten sulphur are hazards and, particularly at the operating temperatures involved, must be effectively maintained in a separated condition. The beta-alumina ceramic electrolyte is shock-sensitive. In addition, it is prone to corrosion by metallic sodium which causes cracks and defects and thus places a limitation on the effective life of such a cell.

In accordance with the second fundamental approach, it was proposed that the electrolyte resistance should be minimized by using electrolytes composed of molten ionic salts that are electrochemically compatible with the electrodes used. When such electrolytes are used, the operating temperature of the cell must be above the melting point of the electrolyte used. One example of such an electrolyte is the LiI:KI eutectic which melts at about 255° C. Other ionic salt systems that melt at much lower temperatures (e.g. around 100° C.) are currently under development. Typically the molten alkali metal-halogen ionic salts fulfill the requirements of electrochemical stability and high ionic conductivity in such cells.

In accordance with this second fundamental approach, it was proposed that the anode could be lithium (or sodium) together with sulphur as cathode and, at the proposed operating temperatures of the cells, both lithium (or sodium) and sulphur could be in the liquid state.

Lithium (or sodium) and sulphur are attractive candidates for use as electrode materials since they have low equivalent weights and can theoretically give rise to a chemical cell with a voltage of about 2.3 V (2.1 V for sodium).

Since the active electrode materials could under normal cell operating conditions be in a liquid state, both would have to be immobilised to avoid safety hazards and ensure proper functioning of such a cell.

Developments in this regard first suggested that the lithium anode should be immobilised by means of a porous stainless steel matrix in which the liquid metal was retained by capillary action. This method was found to be only partially successful. The lithium is not fully trapped during the charging process but tends to escape from the stainless steel matrix as fine particles which diffuse into the electrolyte. As a result, a lithium suspension accumulates between the electrodes which leads to self-discharge of the cell.

Further development work has solved the problem of immobilisation of the lithium anode. This has been accomplished by the use of a lithium-aluminium alloy or a lithium-silicon alloy which is solid at the proposed operational temperature. It has been found that these alloys can be used over a wide concentration range and show good electrochemical behaviour.

The problem which remained to be solved, however, was the problem of immobilisation of the sulphur cathode. At the operating temperatures of about 300° C., the vapour pressure of sulphur is significant (about 60 mm Hg). The result is that the sulphur evaporates rapidly during use and cells utilising molten sulphur cathodes therefore have short lives.

The only relatively successful proposals to overcome the problem of sulphur immobilisation, have been to circumvent the problem by the use of transition metal sulphides such as FeS or $FeS_2$.

These proposals do however have certain disadvantages.

An $FeS_2$ system is highly corrosive and hence necessitates the use of special materials, such as molybdenum, for the current collector of the cell.

While FeS is less corrosive than $FeS_2$, FeS has a significantly lower theoretical energy density than $FeS_2$.

An $FeS_2$ cell has the further disadvantage that it provides a two-stage discharge reaction.

In addition, expansion of both FeS, and $FeS_2$ during charge and discharge cycles can lead to mechanical failure of such cathodes.

This invention is results with cathodes for high temperature electrochemical cells, and with high temperature electrochemical cells wherein the cells are designed to be operated at temperatures above the melting points of the electrolytes used in the variation According to the invention there is provided a cathode for a high temperature cell, the cathode comprising an electronegative element selected from the group consisting of sulphur and selenium, and a molecular sieve carrier wherein the electronegative element is sorbed and wherein the electronegative element is held captive during use of the cathode in a cell.

Further, in accordance with the invention, a method of forming a cathode for a high temperature cell, includes the step of sorbing an electronegative element selected from the group consisting of sulphur and selenium, into a molecular sieve carrier which will hold the electronegative element captive during use in a cell, and housing the molecular sieve carrier in a porous cathode cup.

The molecular sieve carrier may be such that it will hold an effective amount of electrochemically active electronegative element captive for a sufficient period to allow the cathode to operate effectively in a cell for a reasonable period.

Conveniently, however, the carrier may be such that the electrochemically active electronegative element will be held captive during use of the cathode in a cell for which it was designed, throughout the normal operating temperature range of the cell, and without significant loss thereof during an appropriate operating period for the cell.

Molecular sieve carriers have molecular cavities in the form of cages, pores or channels, with the cavities having windows leading to them.

The window sizes of the carrier must therefore be sufficiently large to permit entry of sulphur or selenium atoms into the cavities, and the cavities must be such that the sulphur or selenium atoms can be held captive therein.

Without wishing to be bound by theory, applicants believe that when sulphur or selenium atoms enter such a molecular cavity of an appropriate molecular sieve, they are held captive in the cavity by forces that are primarily of the van der Waal's type. In addition, however, it is believed that sulphur or selenium atoms, as the case may be, form ring or chain structures in appropriate carriers, and that such ring or chain structures can remain intact and coherent during use of the cathode.

If this theory is correct, it would follow that the bulk of such ring or chain structures would alone usually be sufficient to prevent them escaping out of the windows of the molecular cavities of appropriate molecular sieve carriers during use.

To operate effectively as a cathode, the cathode of this invention must permit appropriate ions to have ready access to the sorbed sulphur or selenium, as the case may be, during use of the cathode in a high temperature cell.

It follows therefore that the cathode must allow the appropriate ions to diffuse through it and that the molecular sieve carrier must therefore act as/be an ionic conductor when doped with the electronegative element.

By "doped molecular sieve carrier" is meant that the carrier has the electronegative element sorbed therein in accordance with this invention.

In general, the higher the ion conductivity of the cathode, the better will be performance of a cell using such a cathode.

While ionic conductivity will be less important in the case of a two dimensional cathode, for a three dimensional cathode in accordance with this invention, the molecular sieve carrier should be selected so that the ion conductivity is at least sufficient for effective operation, and is preferably as high as possible.

To operate effectively as a cathode, the cathode must be electron conductive.

The molecular sieve carrier may therefore be selected so that it is sufficiently electron conductive, or so that it is sufficiently electron conductive when it has an effective quantity of sulphur or selenium, as the case may be, sorbed therein.

If this is not the case, an electron conductive material must be included in the cathode. This aspect will be discussed in more detail below.

Various types of natural and synthetic molecular sieve materials are known and they are widely used in industry for purification, scavenging and separation.

Because of the demand for these materials, they are being thoroughly investigated and new molecular sieve materials are being developed and manufactured throughout the world.

By taking into consideration factors such as window size, cavity size, uniformity of window and cavity size, the ability to sorb an electrochemically effective quantity of sulphur or selenium, as the case may be, and the ability to hold the sulphur or selenium captive under operating conditions, a rough guide will be provided for the selection of molecular sieve carriers for particular applications in accordance with this invention.

Further factors which can serve as a guide, can be the degree of porosity, the density, the availability, the mechanical strength, the stability and the electron conductivity of a doped molecular sieve material.

On the basis of factors such as these, molecular sieve materials such as carbon molecular sieves, composite carbon molecular sieves, and certain sorbent (natural or synthetic mineral) substances such as zeolites, modified zeolites, and zeolite-like substances may be considered.

In an embodiment of the invention, the molecular sieve carrier may comprise natural or synthetic zeolites, or modified zeolites which have been physically or chemically modified but still possess appropriate molecular cavities for receiving and retaining the electronegative element.

In this specification, whenever reference is made to a cathode in accordance with this invention comprising a zeolite as the molecular sieve carrier, the reference is to a dehydrated zeolite.

By "zeolites" is meant the class of crystalline or amorphous natural or synthetic materials which contain aluminium and silicon in fairly definite proportions, and their analogues. For a more detailed definition and discussion of zeolites reference can be made to the January 1975 publication of the International Union of Pure and Applied Chemistry entitled "Chemical Nomenclature, and Formulation of Compositions, of Synthetic and Natural Zeolites".

Zeolites usually contain mobile water molecules which may be removed, usually reversibly, by heat and/or evacuation.

Zeolites are usually possessed of a reasonably ordered internal structure, exhibit a high internal surface area and are characterised by the presence of a multiplicity of regular arrays of molecular cavities.

It is believed that zeolites in their hydrated form can be represented by the following structural formula:

$$M_{2/n}O.Al_2O_3.XSiO_2.YH_2O$$

where M is a cation of n valence; and X and Y are independent variables that are a function of the composition of the starting mixture, and the manner of formation.

In an embodiment of the invention, the molecular sieve carrier may comprise dehydrated zeolite crystals selected from the group of naturally occurring zeolites such as faujasite and erionite, or from the group of synthetic zeolites such as zeolite 3A, zeolite 4A, zeolite 5A, zeolite 13X, or the like structures.

Zeolite 4A has the structural formula:

$$Na_{12}((AlO_2)_{12}(SiO_2)_{12}).XH_2O$$

wherein the value of X can vary.

Zeolite 4A has a window diameter of about 4 Angstrom units and a cavity volume of about 1000 cubic Angstrom units.

Zeolite 13X has the structural formula:

$$Na_{86}(AlO_2)_{86}(SiO_2)_{106}).XH_2O$$

where X can vary over a wide range. Zeolite 13X has molecular cavities with diameters of about 13 Angstrom units.

On the basis of the selection factors as previously discussed which can serve as a guide for selecting the molecular sieve carrier, it would be expected that zeolite 4A would be an appropriate carrier for sulphur.

Thus zeolite 4A has a window diameter of about 4 Angstrom units whereas sulphur has an atomic radius of about 2 Angstrom units. Furthermore, zeolite 4A has been found to exhibit adequate ion conductivity when doped.

In addition, it has been found that zeolite 4A has a heat of sorption for sulphur in the region of about $-200$ to $-250$ k cal/mole where sulphur is in an 8 membered ring or chain configuration. This heat of sorption was calculated in the absence of electrolyte and is therefore not directly related to conditions operative in a working cell. It does however serve as a guide that zeolite 4A should hold the sorbed sulphur captive during use of the cathode throughout the operating temperature range of a high temperature cell and should not give rise to any significant loss of electrochemically active sorbed sulphur during normal use.

This has been confirmed experimentally as will be discussed later.

In selecting the molecular sieve carrier, it is believed that a heat of sorption of less than about $-20$ k cal/gram atom for the sorbed electronegative element should be adequate to ensure that the electronegative element will be held captive for the cathode to operate effectively in a cell.

Conveniently, however, the molecular sieve carrier may be selected which has a heat of sorption of less than about $-160$, and conveniently less than about $-200$ k cal/mole of $S_8$ or $Se_8$ either in a ring or chain configuration.

It will be clear from the above that where an electronegative element is sorbed with a heat of sorption of $-200$ k cal/mole it is more strongly sorbed and will be held captive more strongly than where it is sorbed with a heat of sorption of $-160$ k cal/mole.

Suitable zeolite crystals should have a sufficiently high physical strength for effective use in a cathode. In addition, it has been found that doped zeolite crystals are sufficiently resistant to electrochemical damage during repeated use as a cathode in a cell.

Thus physical or electrochemical failure of doped zeolite crystals should not be factors which contribute significantly, if at all, towards failure of a cell wherein the cathode of this invention is used.

It should be noted that the metal cation of zeolites, whether doped or undoped, can generally be substituted by other cations in an ion-exchange process.

If such ion-exchanged zeolites were to be employed as cathodes in cells, with the substitute cations constituting the electrochemical reactants of the cathodes, the cathods will tend to collapse physically and/or chemically during use of the cells. This is due to the fact that the ion-exchanged zeolites form an integral part of the cathodes.

The collapse of the cathode will therefore be a major contributing factor towards failure of such a cell which employs such an ion-exchanged zeolite as a cathode. In addition, it is this collapse which will combat effective recharging of such a cell, thereby making it entirely impractical for use as a secondary cell.

This is in direct contrast with the instant invention where the zeolite constitutes an inert frame for the cathode and does not partake in the electrochemical reaction. It will therefore remain physically and electrochemically stable and will not collapse as a result of the electrochemical reaction during normal use.

This aspect should therefore be borne in mind in selecting the molecular sieve carrer for use in carrying out this invention.

While it is known that zeolites are, in general, ion conductors, zeolites are in general poor electron conductors.

It is furthermore well known that sulphur and selenium, unless they are in a molten state, are poor electron conductors.

It would be expected therefore that a cathode in accordance with this invention comprising sulphur or selenium, as the case may be, sorbed into a molecular sieve carrier in the form of a suitable zeolite, would be a poor electron conductor and would therefore require the inclusion of an electron conductive material before it could be used effectively as a cathode.

In experiments conducted by the applicants it has surprisingly been found that appropriate zeolite crystals having sulphur or selenium sorbed therein in accordance with this invention, form cathode materials each crystal of which exhibits adequate electron conductivity for effective use as a cathode.

Nevertheless, the cathode of this invention may, where necessary, or when desired, include a suitable electron conductive material to provide sufficient electron conductivity between individual crystals through the cathode and hence to enhance the electron conductivity of the cathode.

The method of this invention may include the step of incorporating a suitable electron conductive material into the cathode.

In an embodiment of the invention, the electron conductive material may be any suitable electron conductive material at the operating temperature of the cell, e.g. graphite, $MoS_2$, or the like.

Where the electron conductive material is in the form of graphite, it may be in the form of a porous coating on the zeolite crystals, or in the form of a powder mixed with the zeolite crystals. By 'porous' is meant a coating that allows free access of the electrolyte into the zeolite pores, cavities or channels.

The graphite layer should be porous and conveniently the proportion thereof should be as low as possible consistent with effective electron conduction during use since graphite can act as an electrolyte barrier to limit electrolyte access to the sulphur or selenium, as the case may be.

In practice therefore the proportion of electron conductive material to molecular sieve carrier, should be selected to provide a desired balance between electrolyte access and electron conductivity during use in a cell.

A further factor is that the total mass of the electron conductive material should be as low as possible to give the maximum energy to weight ratio.

In a series of experiments which were conducted, finely dividied graphite in powder form was mixed with undoped zeolite crystals and pellets were formed containing various proportions of graphite and zeolite.

It was found that between about 5 and 16% of graphite had to be added to the zeolite to obtain a sufciently electron conducting pellet for effective use.

Conveniently, however, substantially greater proportions of powdered graphite may be included if required.

In embodiments of the invention therefore, the cathode may include between 5% and 60% by weight of graphite powder.

For loosely compacted structures it will be appreciated that where the cathode comprises a mixture of graphite powder and zeolite crystals, if the graphite particle sizes are too small, electrolyte movement through the cathode will be retarded during use but electronic conductivity will be improved, and vice versa if the graphite particle sizes are too large. In practice therefore a suitable balance will have to be drawn in this regard.

Instead of using graphite in powder form, a series of experiments were conducted using graphite in the form of a colloidal suspension.

In the experiments, relatively low concentrations of the graphite colloidal suspension in water were used to treat zeolite samples. After drying it was found that the treated zeolite was electron conducting and it is believed therefore that a graphite coating must have been formed on the zeolite crystals.

Zeolite crystals could also be coated with graphite using other techniques such as, for example, vapour phase coatings.

The cathode of this invention may be in the form of a self-supporting structure or matrix by being suitably compacted, by being suitably compacted with or supported by a binding agent, by being held in a supporting structure or matrix, by being contained in or located on a porous cathode holder, or the like.

In an embodiment of the invention, the cathode may be contained in a suitable porous, corrosion-resistant cathode holder.

In an example of this embodiment of the invention, the cathode holder may be in the form of a porous graphite cup or vessel.

Where the cathode of this invention is in the form of a compacted cathode, the molecular sieve carrier may be compacted before or after the electronegative element has been sorbed therein, but conveniently after the electronegative element has been sorbed therein.

The molecular sieve material or cathode, as the case may be, may for example be compacted by a pressing operation, by a hot pressing operation, by a sintering operation, by a sintering accompanied by a press operation, or the like.

The reason for performing these operations is to optimize volume, increase electron conductivity and to produce a required shape. The choice of the forming process will be defined by:

(a) the nature of the molecular sieve carrier and dopant in terms of its breakdown temperature and mechanical properties,
(b) the physical shape/size required,
(c) the electrochemical properties required.

Compaction of the cathode can improve interparticle contact thereby providing for enhanced electron conductivity. Compaction of the cathode can, however, reduce the porosity of the cathode and thus influence the diffusion of the electrolyte into the cathode during use.

Compaction of the cathode can be carried out to provide cathode discs or pellets which have sufficient mechanical rigidity to be substantially self-supporting.

Where the discs or pellets have sufficient mechanical rigidity to be self-supporting, they could be used in a cell without any form of holder. Conveniently, however, they may nevertheless still be used in a holder such as a porous cup or bag so that even if they do fracture during use, or the cup or bag fractures during use, the cathode will still remain largely intact.

Compaction of the molecular sieve carrier or of the cathode, as the case may be, may therefore be carried out to balance the requirements of mechanical rigidity and improved electron conductivity against the requirement that electrolyte access to the electronegative element within the cathode should be sufficient during use to provide a sufficient current density.

Where the molecular sieve carrier or the cathode, as the case may be, has been properly compacted, it can provide the advantage that the volume to mass ratio of the cathode has been improved. It can provide the further advantage that since enhanced electron conductivity can be provided, the relative mass of the electron conductive coating material may be reduced, thereby permitting the use of a cathode of a relatively reduced mass.

In addition, where the cathode is substantially self-supporting it can be handled more easily.

In experiments which were conducted, compacted discs were made by adding 16% by weight of graphite powder to zeolite 4A crystals, mixing them thoroughly and then compacting the mixture under pressure.

The discs so formed were dehydrated under vacuum at about 400° C. and were then impregnated with sulphur under a vacuum at 320° C. Analysis showed an uptake of sulphur of approximately 70% of the theoretical value.

These discs had sufficient mechanical rigidity to enable them to be handled effectively but still required to be supported for use in a high temperature cell.

In an embodiment of the invention, the cathode may include a minor proportion in relation to the electronegative element, of stabilizing electronegative element to stabilize sulphur or selenium, as the case may be, in its sorbed condition in the molecular sieve carrier.

The stabilizing element may be any element which is electronegative, is capable of substituting sulphur or selenium atoms, as the case may be, in a sulphur or selenium ring or chain structure within the carrier, and which, once so substituted, will have the effect of lowering the vapour pressure of the ring or chain structure.

The stabilizing elements should be elements which can form principally covalent bonds in the sulphur or selenium ring or chain structures.

Where the electronegative element is sulphur, the stabilizing element may, for example, be selected from the group comprising selenium, arsenic, phosphorus and antimony.

Where the electronegative element is selenium, the stabilizing element may, for example, be selected from the group comprising sulphur, arsenic, phosphorus and antimony.

It is believed that by including a minor proportion of an appropriate stabilizing element in a cathode, the vapour pressure will be reduced sufficiently so that if the cathode temperature is momentarily increased as a result of a short-circuit or the like, the tendency for the sulphur or selenium, as the case may be, to evaporate will be reduced.

The invention further extends to a cathode for a high temperature cell, whenever made by the method as described herein.

Further in accordance with the invention, a method of immobilising an electronegative element selected from the group consisting of sulphur and selenium, for use as a cathode in a high temperature cell, includes the step of sorbing the electronegative element together with a minor proportion of a stabilizing element, into a molecular sieve carrier wherein the electronegative element will be held captive during use as a cathode in a cell.

The invention further extends to a cathode comprising an electronegative element selected from the group consisting of sulphur and selenium, immobilised by the method described herein.

Sorbtion of the electronegative element into an appropriate molecular sieve carrier may be effected by any conventional means.

Thus, for example, the molecular sieve carrier may be dried or dehydrated at elevated temperature under vacuum for an extended period and, at the same time, the sulphur or selenium, as the case may be, may be dried under vacuum at elevated temperature for an extended period. They may then be mixed under vacuum and maintained at elevated temperature for a sufficient period to secure adequate sorbtion of the sulphur or selenium, as the case may be, into the molecular sieve carrier.

The cathode of this invention can have application in primary and in secondary cells. Its major application would however be in the field of rechargeable secondary cells.

The invention therefore extends to a high temperature cell including as one electrode, a cathode as described herein.

The cell may include any appropriate anode, and conveniently, for example, an anode in the form of an alkali metal or an alkali metal alloy anode.

In an embodiment of the invention, the anode may be in the form of a lithium or sodium anode, or in the form of a lithium-aluminium alloy or a lithium-silicon alloy anode.

The cell may include any suitable electrochemically compatible electrolyte.

In an embodiment of the invention, the electrolyte may be in the form of an molten salt ionic electrolyte which is molten at the operating temperature range.

Thus, for example, the molten salt ionic electrolyte may be in the form of a lithium-aluminium-chloride system which melts at about 100° C.

In an alternative example, the electrolyte may be in the form of an alkali metal halide electrolyte system which melts at a temperature of above about 200° C., and usually substantially more.

In an embodiment of the invention, the electrolyte solution may comprise a mixture, and preferably an eutectic mixture of KI-LiI, KCl-LiCl, or the like.

In an embodiment of the invention the electrolyte may be associated with dehydrated zeolite crystals.

In this embodiment the electrolyte may conveniently be impregnated into the dehydrated zeolite crystals.

In this embodiment the zeolite crystals can serve as a convenient carrier for the electrolyte in its molten state during use.

The cell may include any suitable form of electrode separator.

In a specific embodiment of the invention, the electrode separator may include or comprise a fully dehydrated layer of suitable zeolite crystals on the cathode.

In this embodiment, the separator may further function as a scavenger for undesirable reaction products during use and for other cell poisoning materials.

The cell of this invention must be maintained in an inert atmosphere which may, conveniently, be in the form of an argon gas atmosphere.

The cell of this invention may be sealed in any suitable material such as, for example, a corrosion-resistant lightweight material.

In an embodiment of the invention, the cell of this invention may be sealed in an inert gas atmosphere in a stainless steel shell.

It will be appreciated that cells in accordance with this invention can readily be assembled in battery form as may be required. The invention therefore extends to a battery comprising a plurality of associated cells as described herein.

Embodiments of the invention are now described by way of example with reference to the accompanying drawings and with reference to certain experiments which have been conducted.

Figure 1:
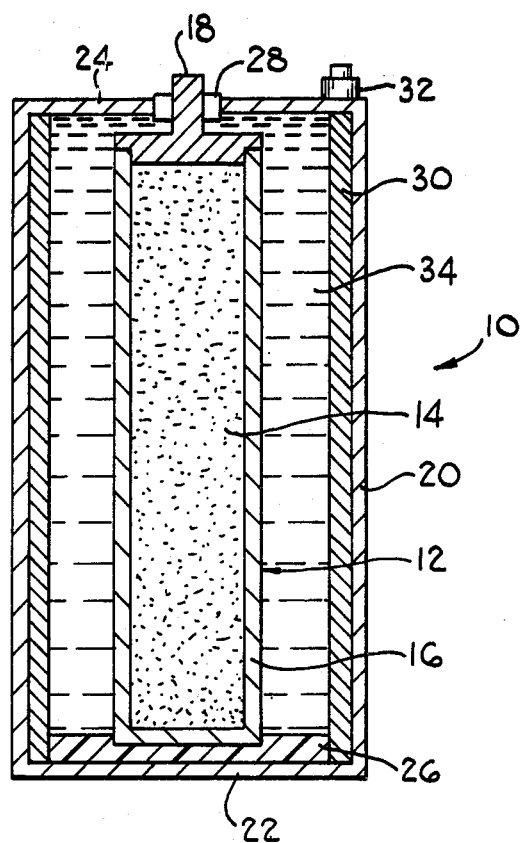
FIG. 1 shows a diagrammatic, sectional side elevation of one embodiment of a rechargeable high temperature lithium/sulphur cell in accordance with this invention, incorporating a cathode in accordance with this invention.

With reference to FIG. 1 of the drawings, reference numeral 10 refers generally to a high temperature rechargeable lithium/sulphur cell in accordance with this invention, incorporating a cathode 12.

The cathode 12 comprises a molecular sieve carrier in the form of dehydrated zeolite 4A crystals having an electronegative element in the form of dried sulphur sorbed therein, with the zeolite 4A crystals containing the sorbed sulphur being mixed in a 1:1 mass ratio with dried powdered graphite to constitute a mixture 14.

The mixture 14 is housed in a porous graphite cathode holder cup 16 into which it has been firmly pressed.

The cathode holder cup 16 has an electronically conducting terminal 18 fitted thereto.

The cell 10 includes a corrosion-resistant cylindrical, stainless steel housing 20 which seals the cell 10.

The housing 20 has a base wall 22 and a top wall 24.

The cathode 12 is centrally positioned in the cell 10, and is supported above the base wall 22 on an insulator pad 26. The insulator pad 26 is conveniently of boron nitride.

The cathode 12 has its terminal 18 extending sealingly through the top wall 24. The terminal 18 is insulated from the top wall 24 by means of an insulator sleeve 28, which is conveniently of a ceramic material.

The cell 10 includes a cylindrical lithiumaluminium alloy anode 30 which is in contact with the housing 20 and has a negative terminal 32 mounted on the top wall 24.

The cell 10 includes, as electrolyte, a potassium iodide-lithium iodide eutectic mixture 34 (having a melting point of 260° C.).

The cell 10 is sealed under an inert argon atmosphere.

Figure 2:
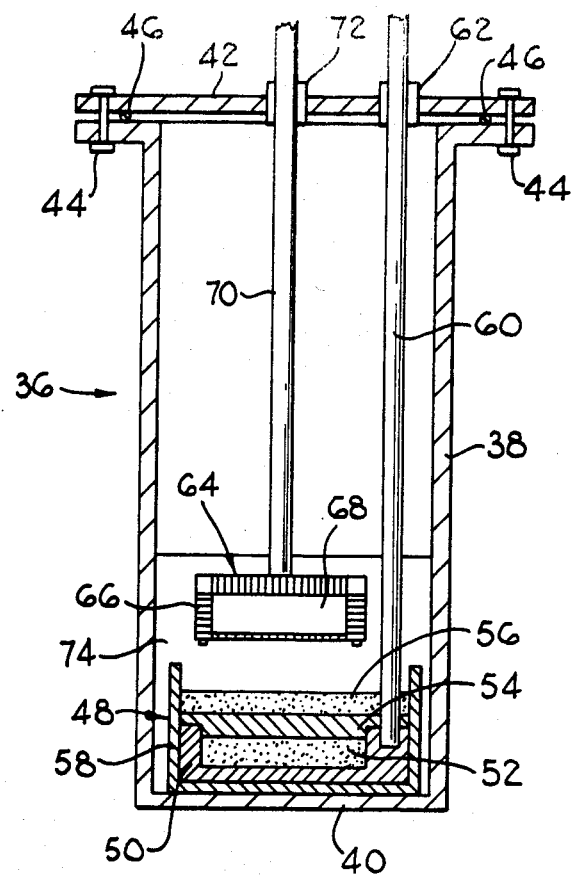
FIG. 2 shows a diagrammatic, sectional side elevation of an experimental cell which was constructed and used for conducting the experiments described herein.

With reference to FIG. 2 of the drawings, reference numeral 36 refers generally to an experimental high temperature cell which was prepared and used for the experiments which were conducted as described herein.

The cell 36 comprises a stainless steel housing 38 having a base wall 40 and a top plate 42 bolted onto the housing 38 by means of bolts 44. A sealing ring 46 ensures an effective seal between the top plate 42 and the housing 38.

The cell 36 includes a cathode 48.

The cathode 48 comprises a porous graphite cathode housing cup 50 which contained the appropriate cathode mixture 52 for the experiments which were performed.

The cathode 48 further includes a porous graphite lid 54 and an electrode separator in the form of a layer 56 of dehydrated zeolite 4A crystals.

The cathode 48 is located in an alumina cup 58, which acts as an insulator from the stainless steel housing, and has an electron conducting terminal rod 60 extending through the top plate 42.

The terminal rod 60 extends sealingly through the top plate 42 and is sealingly insulated therefrom by means of a ceramic insulator sleeve 62.

The cell 36 has an anode 64.

The anode originally comprised a perforated aluminium cup 66 (99% purity) filled with about 2 g of lithium metal 68 which formed a lithium-aluminium alloy during successive charge cycles. The masses of lithium and aluminium were chosen to give an alloy composition in the range 7 to 50 atomic percent lithium.

The anode 64 includes an aluminium rod terminal 70 which extends sealingly through the top plate 42 and is sealingly insulated therefrom by means of a ceramic insulator sleeve 72.

In handling and assembling the cell 36, the various components were handled in a closed argon atmosphere.

The cell 36 contains an electrolyte 74 in the form of an eutectic mixture of lithium iodide and potassium iodide with a melting point of 260° C.

The porous graphite lid 54 has a thickness of about 0.5 cm and a geometric surface area of about 3 cm$^2$.

The electrode separator layer 56 comprised fully dehydrated zeolite 4A crystals which were spread in a uniform layer about 3 mm thick to cover the exposed surface area of the cathode 48. The full dehydrated zeolite layer also acts as a scavenger for undesirable reaction products and impurities. In other experiments boron nitride powder or cloth has also been successfully used as separator material.

The molecular sieve carriers which were used in the experiments comprised synthetically prepared, dehydrated zeolite 4A, 3A and 13X crystals.

While the zeolite crystals may be prepared by any conventional method, for the experiments which were conducted, they were prepared by the method of Charnell, as described for example in the Journal of Crystal Growth 8,291 (1971).

The zeolite crystals so prepared had an average diameter of about 10 microns.

While there are a number of techniques which may be employed for the sorbtion of sulphur or selenium into dehydrated zeolite, the technique should preferably be selected which will provide for the maximum amount of sulphur or selenium, as the case may be, to be sorbed into the dehydrated zeolite.

As far as applicants are aware, one of the most effective techniques is to impregnate dehydrated zeolite from the vapour phase, in which sulphur or selenium is heated to form a vapour which then comes into contact with and is sorbed by the dehydrated zeolite. The sulphur or selenium atoms, as the case may be, enter the molecular cavities of the zeolite structure in such a way that they do not specifically take the place of any existing atoms or molecules in the zeolite.

While it has been found that sorbtion sulphur or selenium into a dehydrated zeolite may have the effect of slightly distorting the zeolite lattice structure, it is believed, on the basis of experimental results obtained, that a zeolite retains its physical structure during use of the cathode in a cell and does not break up during normal use.

It has further been found from experiments conducted, that doped zeolite crystals in accordance with this invention are resistant to electrochemical damage during repeated use of the cathode in a cell.

There is a clear indication therefore that the metal cations which form an integral part of the undoped zeolite crystals, are not materially affected and do not undergo changes in their oxidation states during use of such doped zeolite crystals as cathodes in cells.

There is therefore a material difference between the doped zeolites of this invention, and reducible metal ion-exchanged zeolite materials.

If such ion-exchanged zeolite materials are used as a cathode in a cell, the reducible metal ion constitutes the electrochemically active element of the cathode. The consequence hereof is that the zeolite will break up physically and/or electrochemically during use leading to failure of the cathode.

While this can be material in the case of a primary cell, it is particularly serious in the case of a secondary (or rechargeable) cell.

For forming the cathode mixture for the various experiments, the prepared zeolite crystals were dehydrated at about 350° C. and $10^{-6}$ Torr for 24 hours. At the same time finely divided sublimed sulphur was dried at about 105° C. and $10^{-6}$ Torr for about 36 hours. The two samples were then mixed under vacuum and maintained at about 300° C. for about 100 hours, then about 270° C. for about 240 hours and finally at about 115° C. for about 90 hours as the sulphur either distilled away or formed separated crystals mixed with those of the zeolite in a loose powder.

Zeolite crystals were doped with selenium in a similar manner. The initial impregnation temperature in this instance was approximately 600° C.

It was found that the sulphur, or selenium, as the case may be, effectively penetrated the zeolite crystal lattice and was strongly retained within the lattice.

After the sulphur or selenium, as the case may be, had been sorbed into the molecular sieve carrier, the cathode mixture 52 was formed by adding dried, purified powdered graphite in a 1:1 mass ratio, thoroughly mixing, and then compacting the cathode mixture 52 into the cathode housing cup 50.

For the experiments which were conducted, the cathode mixture 52 consisted of 3 g zeolite-sulphur crystals or zeolite-selenium crystals, as the case may be, and the cells had capacities of about 1 amp-Hr.

In the experiments which were conducted with these cells, after the cells had been brought to their required operating temperature above the melting point of the molten ionic salt electrolyte, automatic constant current charge/discharge cycling was started and the relevant electrical parameters were measured.

Operating conditions were similar in all cases, as were as follows:

| | | |
|---|---|---|
| Charge/discharge current | : | 50 mA/cm² |
| Anode | : | Li—Al alloy |
| Cathode | : | Doped zeolite/graphite |
| Electrolyte | : | LiI/KI eutectic |
| Temperature | : | 300° C. |
| *Upper cut-off voltage | : | 2.3 V |
| *Lower cut-off voltage | : | 1.1 V |

*By upper (lower) cut-off voltage is meant the upper (lower) limit to which the cell is charged (discharged).

The average result of the various experiments which were performed, are set out in Table I below. Insofar as these experimental results are concerned, it must be appreciated that these are largely preliminary results and some variations would therefore be expected on repetition.

TABLE 1

| System | 4A/S | 3A/S | 13X/S | 4A/Se |
|---|---|---|---|---|
| Open circuit voltage (V) | 1.80 | 1.80 | 1.80 | 1.70 |
| Short circuit current (mA/cm²) | 1100 | 1000 | 500 | 500 |
| Energy density (Watt hr/Kg based on zeolite/S (or Se) + Li only) | 404 | 350 | 130 | 280 |
| Maximum power (Watt/cm²) | 0.5 | 0.4 | 0.2 | 0.2 |
| Coulomb efficiency (%) | 90 | 98 | 60 | 99 |
| Sulphur (or Se) (utilization (%)) | 62 | 61 | * | 65 |
| Internal resistance (ohms/cm²) | 0.5 | 1.6 | 3.6 | 3.4 |
| Numbers of cycles | 300 | **30 | 5 | **50 |
| Approximate number of working hours | >3600 | 360 | 50 | 500 |

*Theoretical sulphur uptake unknown.
**Cells still in operation at time of compilation of results.

Figure 3:
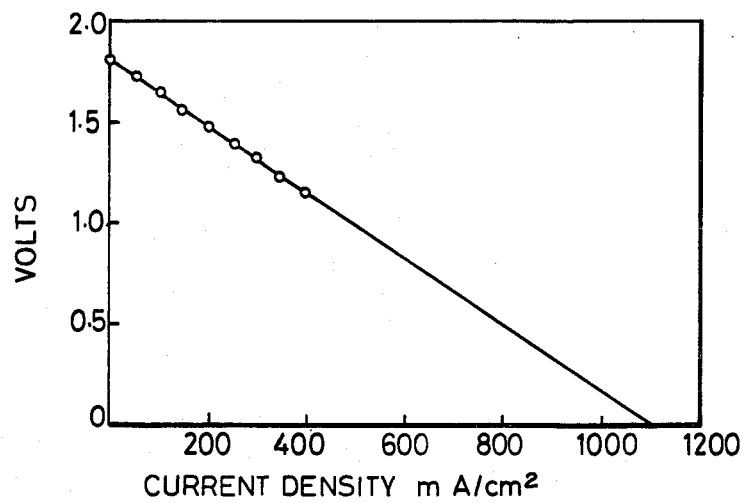
FIG. 3 shows a graph of voltage against current density for the experimental cell of FIG. 2.
Figure 4:
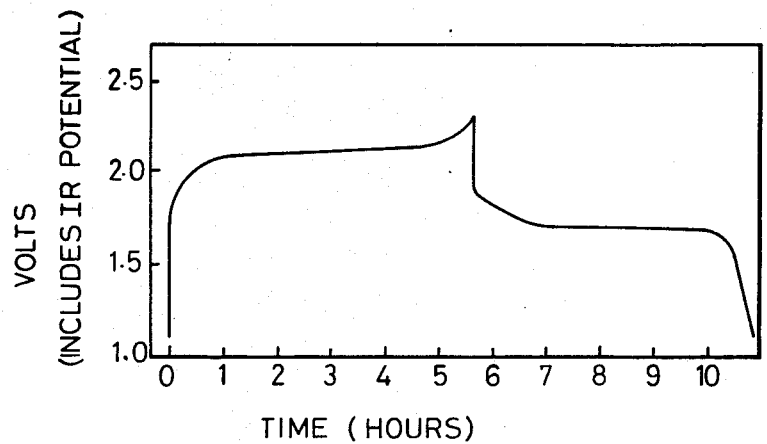
FIG. 4 shows a typical charge-discharge curve for the experimental cell of FIG. 2.

From the experiments which were conducted on the cathode mixture comprising zeolite 4A crystals having sulphur sorbed therein, the graphs of FIGS. 3 and 4 were prepared.

FIG. 3 sets out graphically the results obtained for short-time voltage against current density. These data were obtained from fully charged cells and the individual measurements were made over ten-second periods.

FIG. 4 graphically sets out a typical charge-discharge curve when the cell voltage V (includes IR potential) is plotted against the time in hours.

It will be noted from the average experimental results as set out in Table 1 above, that the open circuit voltages of the various cells do not vary much. From this it appears that the activity of the sulphur held captive in the various zeolite structures, is almost invariant to the choice of zeolite.

Insofar as the short circuit current is concerned, this depends, inter alia, on the internal resistance of the cell.

The internal resistance on the other hand is markedly affected by such factors as the porosity of the cathode cup and the inter electrode distance.

In the experiments which were performed, the cathode cups had a porosity of between 30 and 50%, and the inter electrode distance was approximately 1 cm.

It follows from this that the internal resistance of the various cells was not optimised. Upon optimisation, lower internal resistance values would be expected and this would lead to improved short circuit current values.

Insofar as the energy density and sulphur utilisation values are concerned, those reported in Table 1 above are all based on experimental data.

Calculations were made using the average discharge voltages together with the capacities (amp-Hrs) obtained on discharge.

The observed energy densities are dependent on the sulphur utilisation. As can be seen in Table 1, rather low values of sulphur utilisation were recorded.

Applicants believe that by improving the preparational techniques and the purities of the starting materials, sulphur utilisation could be improved up to about 80% or more. This will lead to a substantial increase in the energy density.

The respective sulphur utilisation values for the zeolite 3A/sulphur and zeolite 4A/selenium systems are based on the assumption that these zeolites would sorb the same number of sulphur and selenium atoms per formula unit as in the case of zeolite 4A/sulphur.

These formulae are:

4A/S: $Na_{12}Al_{12}Si_{12}O_{48}.Se_{16}$

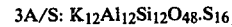
3A/S: $K_{12}Al_{12}Si_{12}O_{48}.S_{16}$

4A/Se: $Na_{12}Al_{12}Si_{12}O_{48}.Se_{16}$

Chemical analyses have shown that only 80% of the theoretically possible sulphur impregnation of the zeolites has in fact been achieved. The values of sulphur utilisation as set out in Table 1 are based on 100% sulphur impregnation.

These values are therefore expected to be improved under appropriate conditions.

The maximum power depends on the current density which, as mentioned above, has not been optimised. It is expected therefore that the maximum power values could be improved in an optimised system.

The Coulombic efficiency is a measure of the ratio of charge input to charge output.

Apart from the zeolite 13X system, the values as set out in Table 1 are extremely satisfactory.

The relatively poor value of the coulombic efficiency for zeolite 13X could be attributable for example to impurities that electrolyse in the cell or to internal charge leakage.

Insofar as the number of cycles is concerned, in the zeolite 4A/sulphur cathode system, the cell operated for about 100 cycles (more than 1200 hours) of continuous operation without any significant deterioration. Thereafter, a slow deterioration was noted.

After 300 continuous cycles, the energy output had been reduced to about 50% of its initial value.

It is believed that this deterioration can be attributed to non-intrinsic corrosion and breakdown of the cell materials as a result of impurities. It follows therefore that once the cell materials in accordance with this invention have been optimised, the effective life of a cell should be increased substantially.

Insofar as the number cycles is concerned for the 3A/sulphur cathode, system, the values indicated in Table 1 were obtained after 30 cycles.

The cell containing the zeolite 13X/sulphur cathode operated for only 5 cycles before it was accidentally terminated.

Insofar as the zeolite 4A/selenium cathode system is concerned, the values of the cell parameters given in Table 1 were obtained after 50 cycles. After the cell had been operated for a further 20 cycles no significant deterioration was evident.

While the experiments which have been performed have been of a preliminary nature and were performed on relatively small test cells, they do give an indication of certain advantages which can be provided by a cell, and by a cathode, in accordance with this invention.

It has been well documented in the literature that a battery for electric vehicle propulsion should ideally meet the following requirements:

1. It should have a good power-weight ratio;
2. It should have a good energy-weight ratio;
3. It should provide a large number of charge-discharge cycles;
4. It should be safe in an accident;
5. It should be cheap to produce;
6. The materials used should be abundant;
7. It should have a high charge rate;
8. It should have a one-stage discharge cycle -that is approximately constant voltage throughout discharge cycle; and
9. It should have a long shelf life.

These requirements are now discussed with reference to the preliminary experimental results as set out in Table 1, as provided by a cell in accordance with this invention incorporating, as a cathode, the zeolite 4A/sulphur system.

Insofar as the first requirement is concerned, the power-weight ratio is to a significant extent dependent on cell design (as well as the active components employed) inasmuch as it is the active surface area of the electrode that is one of the more important limiting factors in the power output of the system. A zeolite:sulphur cathode acts as a three dimensional electrode since it permits the electrolyte to diffuse freely throughout the cathode and the sulphur held captive therein is therefore virtually all accessible to the electrolyte.

In addition, an alkali metal-sulphur battery has an extremely high theoretical energy.

Insofar as the energy-to-weight ratio is concerned, available literature shows that, for cells comprising lithium-silicon alloy anodes and the following types of cathodes, the theoretical and achieved energy densities in w-hr/kg are as follows:

| Cathode | Theoretical energy density (w-hr/kg)* | Achieved energy density (w-hr/kg)** |
|---|---|---|
| FeS | 458 | 84 |
| FeS$_2$ | 650 | 150 |
| Liquid S | 2680 | 300+ |

*Energy density based on the masses of the active electrode material only.
**Energy density based on total cell mass.

The literature shows that, where the cathode comprises liquid sulphur, held captive in a porous matrix, rapid loss of sulphur results in rapid decay during use, making this type of cell unattractive as a secondary cell.

For a zeolite/sulphur cathode in accordance with this invention, the theoretical energy density is 635 w-hr/kg, based only on the masses of the zeolite sulphur cathode and a pure lithium anode.

With 60% sulphur utilisation using a lithium-silicon anode an energy density of about 160 w-hr/kg can be achieved. With 90% sulphur utilisation, with the same anode the optimum energy density that may be expected would be about 240 w-hr/kg. These figures take into account total cell weight which is based on available data taken from the current literature.

In the case of a cell wherein the anode is a lithium-aluminium alloy, with 90% sulphur utilisation, a cell in accordance with this invention would be expected to provide 214 w-hr/kg, and 143 w-hr/kg with 60% sulphur utilisation.

Since cells in which the cathode comprises FeS or FeS$_2$ are conceptually the most closely related to the cells in accordance with this invention and are serious contenders for ultimate use in vehicle propulsion, the above comparison is valid and indicates that an optimised cell in accordance with this invention should have a sufficient energy-to-weight ratio for use in electrical vehicle propulsion.

To achieve a large number of cycles in accordance with the third requirement mentioned above, the sulphur or selenium, as the case may be, must remain firmly captured within the molecular sieve carrier during the repeated charge-discharge cycles, and the cathode must be mechanically and chemically stable and must not disintegrate or degrade mechanically or chemically during repeated cycling.

The experimental results as set out in Table 1 above, particularly in relation to the zeolite 4A/sulphur cathode, already indicate that a cathode in accordance with this invention can achieve these objectives.

A test cell incorporating this cathode was charged and discharged over 100 times without significant loss of coulomb efficiency and sulphur utilisation.

Without wishing to be bound by theory, applicants believe that sulphur or selenium, as the case may be, when sorbed into a suitable molecular sieve carrier such as a suitable zeolite, could exist in the form of rings (as sulphur does in the zeolite 4A/S structure) or as chains within the cavities of the dehydrated zeolite lattice.

Since the experiments which have been conducted indicate that there is no detectable loss of sulphur or selenium over a reasonable period, applicants believe that this indicates that the rings or chains remain intact and coherent during the charge and discharge cycles. In addition, applicants believe that this indicates that when lithium ions react with sulphur/selenium at the cathode during use, to form the compound lithium sulphide/selenide, the electrochemical reaction occurs within the molecular cavities of the zeolites. Thus it appears that lithium sulphide or lithium selenide, as the case may be, which are known to be soluble in the electrolyte, remain within the molecular cavities during use.

This theoretical explanation could further indicate that any volumn changes during use would be absorbed by the zeolite lattice and would therefore result in insignificant volume changes to the cathode itself. Hence, a cathode in accordance with this invention, in a compressed form, could tend to be resistant to the type of mechanical break-up which is prevalent in other common cathodes.

Insofar as the fourth requirement for a vehicle battery is concerned, since the sulphur or selenium, as the case may be, is held captive by the zeolite, the danger of sulphur coming into contact with the lithium anode in the event of an accident, in such a way as to be explosive or hazardous, is virtually zero. This would tend to be so even in an extreme case where the lithium alloy anode actually touches the cathode.

Insofar as the fifth and sixth requirements for vehicle batteries are concernec, naturally occurring zeolites are cheap and readily available, whereas synthetic zeolites can be synthesised both readily and cheaply. Sulphur is readily and cheaply available, whereas selenium, while scarcer and more expensive than sulphur, could still be used on a competitive basis for certain applications.

Insofar as the required charge rate is concerned, since a cathode in accordance with this invention can be a three dimensional cathode which has a large potential surface area, and since an electrolyte with a high current density can be employed, commercial batteries should be able to sustain a sufficiently high charge rate.

Insofar as the requirement is concerned relating to a one-stage discharge cycle, it can be seen from FIG. 4 of the drawings that the voltage remains virtually constant for approximately 80% of the discharge cycle.

Insofar as the shelf life is concerned, because of the stability at relatively high operating temperatures, it would be expected that the shelf life would be more than adequate for, inter alia, motor vehicle propulsion and off-peak energy sorage.

To test out this concept the cell comprising zeolite 4A doped with selenium was left in the fully charged state at the normal operating temperature of the cell for 250 hours. No significant loss of capacity was observed.

For mechanisms for off-peak energy storage in utility networks, requirements relating to weight tend to fall away. The requirements for such energy storage mechanism are therefore, in general, high coulombic efficiency, high charge rate, the ability to withstand a very high number of charge and discharge cycles, low maintenance requirements, and safety in the case of accidents.

It is submitted that the preliminary experimental results as set out in Table 1 above, indicate that an optimised cell in accordance with this invention, incorporating an optimised cathode in accordance with this invention, should provide an energy storage mechanism which can have application both in regard to electric vehicle propulsion and in regard to off-peak energy storage.

It should further be noted that molecular sieve carriers which are suitable, and in particular zeolites, tend to be stable at high temperatures (in many cases in excess of about 600° C.) and are sufficiently light to provide good power-weight ratios.

It is an advantage of the embodiments of the invention as illustrated with reference to the drawings and with reference to the experiments conducted, that a cathode and a cell are provided in which elemental sulphur or elemental selenium, as the case may be, while readily available for effective electrochemical utilisation, has been effectively incorporated in the appropriate molecular sieve carrier and is effectively held captive therein during use at the required operating temperatures. It can thus provide an effective solution for the problem of the evaporation of the electronegative element during use, and can thus provide a cell with efficiency and stability.

I claim:

1. A cathode for a high temperature cell, the cathode comprising an electronegative element selected from the group consisting of sulphur and selenium, and a molecular sieve carrier comprising dehydrated zeolite crystals wherein the electronegative element is sorbed and wherein the electronegative element is held captive during use of the cathode in a cell.

2. A cathode according to claim 1, in which the molecular sieve carrier has a heat sorption of less than about −20 k cals/gram atom for the sorbed electronegative element.

3. A cathode according to claim 2, in which the molecular sieve carrier has a heat of sorption of less than about −160 k cals/mole for the sorbed electronegative element in 8-membered molecular form.

4. A cathode according to claim 3, in which the molecular sieve carrier has a heat of sorption of less than −200 k cals/mole for the sorbed electronegative element in 8-membered molecular form.

5. A cathode according to claim 2, which is in the form of a compact formed by compaction under pressure.

6. A cathode according to claim 2, which is housed within a porous cathode holder.

7. A cathode according to claim 1, in which the dehydrated zeolite crystals are in the form of naturally occurring zeolite crystals selected from the group comprising erionite and faujasite crystals.

8. A cathode according to claim 1, in which the dehydrated zeolite crystals are selected from the group of synthetic zeolites comprising zeolite 3A, zeolite 4A and zeolite 13X crystals.

9. A cathode according to claim 8, in which the dehydrated zeolite crystals are in the form of zeolite 4A crystals.

10. A cathode according to claim 8, in which the dehydrated zeolite crystals are in the form of zeolite 3A crystals.

11. A cathode according to claim 1, including an electron conductive material which is electron conductive during use.

12. A cathode according to claim 11, in which the electron conductive material comprises graphite powder associated with the molecular sieve carrier.

13. A cathode according to claim 1, in which a minor proportion of a stabilizing electronegative element is included in the cathode to stabilize the electronegative element in its sorbed condition in the cathode during use.

14. A cathode according to claim 13, in which the electronegative element is sulphur, and in which the stabilizing electronegative element is selected from the group comprising selenium, arsenic, phosphorus and antimony.

15. A high temperature cell including a cathode, an anode and an electrolyte, the cathode comprising an electronegative element selected from the group consisting of sulphur and selenium, and a molecular sieve carrier comprising dehydrated zeolite crystals wherein the electronegative element is sorbed and wherein the electronegative element is held captive during use of the cathode in a cell.

16. A cell according to claim 15, in which the molecular sieve carrier has a heat sorption of less than about −20 k cals/gram atom for the sorbed electronegative element.

17. A cell according to claim 16, in which the molecular sieve carrier has a heat of sorption of less than about −160 k cals/mole for the sorbed electronegative element in 8-membered molecular form.

18. A cell according to claim 17, in which the molecular sieve carrier has a heat of sorption of less than −200 k cals/mole for the sorbed electronegative element in 8-membered molecular form.

19. A cell according to claim 16, in which the dehydrated zeolite crystals are in the form of naturally occurring zeolite crystals selected from the group comprising erionite and faujasite crystals.

20. A cell according to claim 16, in which the cathode is in the form of a compact formed by compaction under pressure.

21. A cell according to claim 16, in which the cathode is housed within a porous cathode holder.

22. A cell according to claim 16, in which a minor proportion of a stabilizing electronegative element is included in the cathode to stabilize the electronegative element in its sorbed condition in the cathode during use.

23. A cell according to claim 22, in which the electronegative element is sulphur, and in which the stabilizing electronegative element is selected from the group comprising selenium, arsenic, phosphorus and antimony.

24. A cell according to claim 15, in which the dehydrated zeolite crystals are selected from the group of synthetic zeolites comprising zeolite 3A, zeolite 4A and zeolite 13X crystals.

25. A cell according to claim 24, in which the dehydrated zeolite crystals are in the form of zeolite 4A crystals.

26. A cell according to claim 24, in which the dehydrated zeolite crystals are in the form of zeolite 3A crystals.

27. A cell according to claim 15, in which the cathode includes an electron conductive material which is electron conductive during use.

28. A cell according to claim 27, in which the electron conductive material comprises graphite powder associated with the molecular sieve carrier.

29. A cell according to claim 15, in which the anode includes an alkali metal.

30. A cell according to claim 29, in which the anode is in the form of an alkali metal alloy anode.

31. A cell according to claim 30, in which the anode comprises a lithium-silicon or a lithium-aluminium alloy.

32. A cell according to claim 15, in which the electrolyte comprises a molten salt ionic electrolyte which is molten during use.

33. A cell according to claim 32, in which the electrolyte comprises an alkali metal halide electrolyte.

34. A cell according to claim 33, in which the electrolyte comprises an eutectic mixture of potassium iodide-lithium iodide, or potassium chloride-lithium chloride.

35. A cell according to claim 32, in which the electrolyte is associated with dehydrated zeolite crystals.

36. A cell according to claim 32, including an electrode separator in the form of a layer of dehydrated zeolite crystals which is capable of acting as a scavenger.

37. A method of immobilizing an electronegative element selected from the group consisting of sulphur and selenium, for use as a cathode in a high temperature cell including an anode and an electrolyte, which includes the step of sorbing the electronegative element together with a minor proportion of a stabilizing electronegative element, into a molecular sieve carrier comprising dehydrated zeolite crystals wherein the electronegative element will be held captive during use as a cathode in a cell.

38. A method according to claim 37, in which the electronegative element is sulphur, and the stabilizing electronegative element is selected from the group comprising selenium, arsenic, phosphorus and antimony.

39. A method according to claim 37, in which the electronegative element is selenium and the stabilizing electronegative element is selected from the group comprising arsenic, phosphorus and antimony.

* * * * *